J. L. WOODBRIDGE.
SYSTEM FOR ELECTRICAL DISTRIBUTION.
APPLICATION FILED NOV. 13, 1907.

905,971.

Patented Dec. 8, 1908.

WITNESSES:

INVENTOR.
Joseph Lester Woodbridge
BY
Augustus B Houghton
ATTORNEY.

UNITED STATES PATENT OFFICE.

JOSEPH LESTER WOODBRIDGE, OF PHILADELPHIA, PENNSYLVANIA.

SYSTEM FOR ELECTRICAL DISTRIBUTION.

No. 905,971.  Specification of Letters Patent.  Patented Dec. 8, 1908.

Application filed November 13, 1907. Serial No. 401,912.

*To all whom it may concern:*

Be it known that I, JOSEPH LESTER WOODBRIDGE, a citizen of the United States, and a resident of Philadelphia, in the county of Philadelphia and State of Pennsylvania, have invented a certain new and useful System of Electrical Distribution, of which the following is a specification.

My invention relates to those systems in which both alternating and direct currents are employed and in which converting apparatus is used for interchangeably transforming either kind of current to the other. It may also be employed for controlling the division of load between two sources of alternating current supplying a common consumption circuit.

The object of my invention is to provide more sensitive means for effecting a transfer of energy between an alternating current and a direct current circuit, or between two sources of alternating currents and to largely eliminate the time lag which would otherwise exist due, for example, to the inertia of moving parts.

It is well known that if, for example, two alternating current generators are operating in parallel and it is desired to shift a part of the load from one to the other a change in the phase relation of the moving members of the two must be brought about. This is usually accomplished by supplying more energy to the one whose load is to be increased. This method cannot, however, effect an instantaneous transfer of load since the inertia of the moving parts prevents an instantaneous shifting of the phase relation. In order to obviate this time lag I provide means for shifting the phase relation of the alternating current electro-motive-force developed in one with respect to the other, without necessitating a shifting of the phase relation of the moving parts themselves. By the means described herein this shifting of the electro-motive-force can be accomplished practically instantaneously and the desired transfer of load can thus be effected without the time lag mentioned above.

Figure 1:
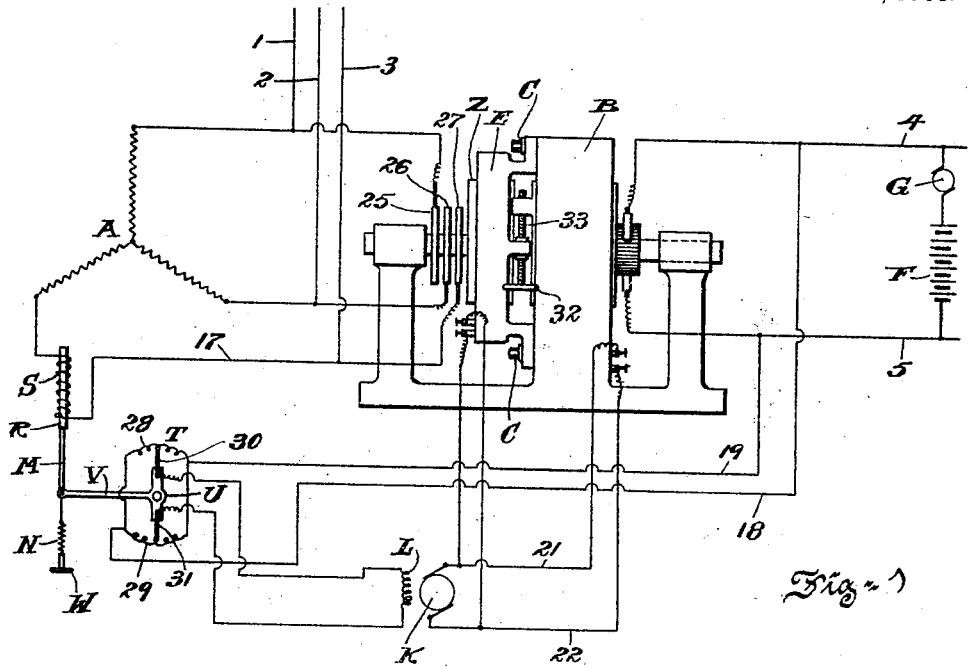
Figure 2:
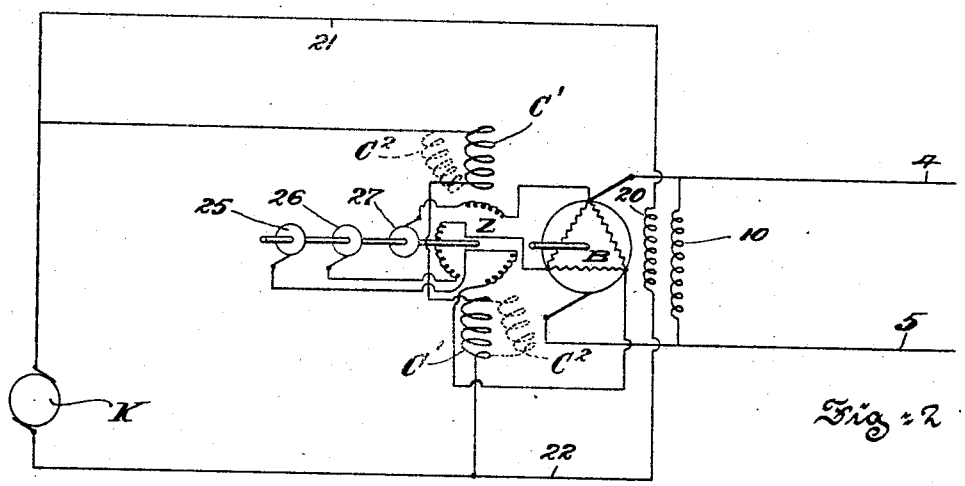
Figure 3:
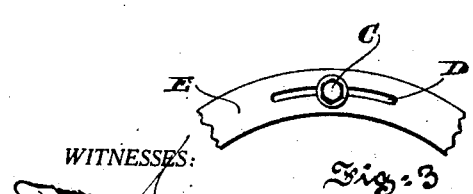
Figure 4:
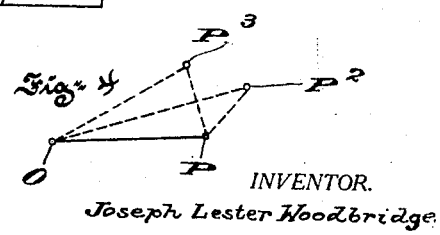

The nature, characteristic features and scope of my invention will be more fully understood by reference to the following description taken in connection with the accompanying drawings forming part hereof, and in which Figure 1, shows apparatus embodying features of the invention. Fig. 2, is a diagrammatic representation of a portion of the circuits included in Fig. 1. Fig. 3, is another view of part of the apparatus shown in Fig. 1, and Fig. 4, is a vector diagram to which reference will be made in describing the operation of the apparatus shown in Fig. 1.

In Fig. 1, A, is a source of three-phase alternating current feeding the consumption circuit 1, 2, 3. Connected in parallel with A, by means of the collector rings 25, 26, and 27, and suitable brushes, is shown a rotary converter B, whose direct current brushes are connected to the direct current circuit 4—5. On the shaft of the rotary converter is mounted a supplemental armature Z, revolving in the field whose frame is shown at E. The windings of the armature Z, are connected in series between the alternating current terminals of the rotary armature and the collector rings 25, 26, and 27, and in this armature Z, is developed a supplemental electro-motive-force, whose phase relation may be so adjusted that the phase relation of the combined electro-motive-forces of the two armatures may be controlled. This result is accomplished by supporting the field frame E on the frame of the rotary by means of bolts C C, passing through slots in projections of the field frame E, thus permitting the entire field frame E, to be rotated through a certain angle and held in any desired angular relation to the field frame of the converter B, by means of the hand-wheel 32 and the screw 33.

Fig. 3, shows a front view of the bolt C and the slot D. In Fig. 4, is shown a diagram of the connections showing the windings of the armature Z, connected in series between the alternating current terminals of the rotary converter B and the collector rings 25, 26, and 27. Two angular positions of the field are shown at $C^1$ and $C^2$, corresponding to two positions of the field frame E, of Fig. 1. The field winding $C^1$ of the auxiliary machine is excited by the exciter K, whose field L, is excited by the regulator T, which is made responsive to the current on the alternating current circuit by means of a solenoid S, connected into said circuit. The exciter K, is also connected by conductors 21 and 22, to an auxiliary field 20 on the converter B, which coöperates with the main field 10, of this converter. This regulator T, consists of two resistances 28 and 29, connected in parallel across the direct current circuit 4—5 by means of the conductors 18 and 19. Each of these resistances is provided with suitable contacts at various points, with which the contact pieces 30 and 31, make contact. These contact pieces are connected to the opposite terminals of the exciter field winding L. These two contact pieces 30 and 31, are mounted upon an insulating arm U, pivoted at its center, upon which center it may be turned in either direction by means of the arm V, attached thereto. The arm U, is so arranged that in its middle position the contact pieces 30, and 31, are in contact with the middle points of the two resistances 28 and 29 respectively, and in this position there will therefore be no difference of potential between them and no current flowing through the field winding L. If the arm U, is moved in one direction, current will flow through L, in a certain direction, whereas if U, is moved in the opposite direction the current in L, will be reversed, thus by moving the arm U, in either direction from its mean position the amount and direction of current in the field L, and therefore the amount and direction of voltage of the exciter K, may be controlled. The arm V, is attached by means of the rod M, to the core R, of a solenoid S, which is connected into the conductor 17, carrying the current from one of the terminals of the source A. Opposing the force exerted by this solenoid on its core R, is shown a spring N, which by means of the adjustable screw W, may be made to exert any desired tension and thus adjust the position of the arms U, and V, for any given current in conductor 17. Across the direct current circuit 4—5 is shown a storage battery F and its booster G, which latter may be controlled in any suitable manner, but it will be understood that any suitable source of direct current may be connected to this circuit.

The operation of this apparatus is then as follows: With a certain normal load in the consumption circuit 1, 2, 3 the source A, is supplying the entire demand and the excitation of the converter B, is such that no energy is transmitted in either direction between the alternating current and the direct current circuits. The force exerted on the core R, of the solenoid S, is so balanced by the spring N, that the arm U, is in its mean position and the voltage of K, is zero. No current is therefore flowing in the field winding of the auxiliary machine E, nor in the auxiliary field winding 20, of the converter. If now the load on the consumption circuit increases, a small portion of the increase getting back to the source A, through the solenoid S, will increase the force exerted on R and draw the arm V upwards, shifting the points of contact between the contact pieces 30 and 31 and the resistances 28 and 29 in such a way that current will flow through the field winding L of the exciter K, which will in turn supply current to the field winding of the auxiliary machine E and to the auxiliary field 20 of the converter. The flow of current in the windings C¹, as well as the adjustment of the field frame E, with respect to the frame of the converter B, should be such that this flow of current from the exciter K, will produce an electro-motive-force in the auxiliary machine E leading in phase position with respect to the electro-motive-force of the rotary converter. This will cause the rotary converter to transmit energy from the direct current circuit to the alternating current circuit, thus relieving the source A of the greater portion of the increase of load above mentioned, and current in the auxiliary winding 20 of the converter will be in such direction as to reduce the excitation of the converter and permit direct current to flow into it from the direct current circuit 4—5, corresponding to the output of the converter to the alternating current circuit.

Fig. 4, is a vector diagram which will serve to illustrate the operation of this apparatus. The line O, P may be taken to represent the amount and phase position of the alternating current electro-motive-force developed in the converter B. The line P, P², may be taken to represent in amount and phase position the electro-motive-force developed in the auxiliary armature Z. Since these two electro-motive-forces are in series the line O, P² will represent the resultant electro-motive-force at the collector rings and it will be seen that this resultant assumes a phase position in advance of the electro-motive-force of the converter by an angle dependent upon the phase position of the auxiliary electro-motive-force P. P². If the phase position of the latter be shifted into a position corresponding with the line P, P³, which may be accomplished by rotating the frame E, the resultant electro-motive-force will assume a phase position corresponding with the line O, P³.

This application contains matter not specifically claimed herein but which matter is claimed in my copending application, Serial No. 329,042.

What I claim is:

1. An alternating current circuit and its source, a direct current circuit and its source, transforming apparatus adapted and connected to transfer energy in either direction between them, means including an alternating current armature and its field for developing between the transforming apparatus and the alternating current circuit an alternating current electro-motive-force having a component at right angles to that of the transforming apparatus, and means responsive to the electrical condition of the alternating current circuit for controlling said field.

2. An alternating current circuit and its source, a direct current circuit and its source, transforming apparatus adapted and connected to transfer energy in either direction between them, an auxiliary dynamo provided with a field and an armature winding, said winding connected in series between the transforming apparatus and the alternating current circuit and adapted to develop an alternating current electro-motive-force having a component at right angles to the alternating current electro-motive-force of the transforming apparatus, and electro-responsive means for simultaneously controlling the field of the auxiliary dynamo and the direct current electro-motive-force of the transforming apparatus to transfer energy from one circuit to the other.

3. An alternating current circuit and its source, a direct current circuit and its source, transforming apparatus adapted and connected to transfer energy in either direction between them, an auxiliary dynamo provided with a field and an armature winding, said winding connected in series between the transforming apparatus and the alternating current circuit and adapted to develop an alternating current electro-motive-force having a component at right angles to the alternating current electro-motive-force of the transforming apparatus, and means responsive to the load on the alternating current circuit for simultaneously controlling the field of the auxiliary dynamo and the direct current electro-motive-force of the transforming apparatus to transfer energy from one circuit to the other.

4. An alternating current circuit, two sources of alternating current electro-motive-force connected in parallel relation to the circuit, an auxiliary dynamo provided with a field and an armature winding, said winding connected in series between one of the two sources and the circuit and adapted to develop an alternating current electro-motive-force having a component at right angles to the alternating current electro-motive-force of said source, and means responsive to the electrical condition of the circuit for controlling the field of the auxiliary dynamo.

5. An alternating current circuit and its source, alternating current apparatus adapted to develop alternating current electro-motive-force connected to said circuit, means for supplying energy to said apparatus, an auxiliary dynamo provided with a field and an armature winding, said winding connected in series between the alternating current apparatus and the circuit and adapted to develop an alternating current electro-motive-force having a component at right angles to that of the alternating current apparatus, and electro-responsive means for simultaneously controlling the field of the auxiliary dynamo and the supply of energy to the apparatus.

In testimony whereof I have hereunto signed my name in the presence of witnesses.

JOSEPH LESTER WOODBRIDGE.

Witnesses:
W. J. JACKSON,
FRANK E. FRENCH.